Patented Apr. 11, 1950

2,503,873

UNITED STATES PATENT OFFICE 2,503,873

COMPOSITIONS OF POLYVINYL ACETALS AND POLYMERIC 4-VINYLCYCLOHEXENE DIOXIDE

Walter John Hornibrook, McMasterville, Quebec, Canada, assignor to Canadian Industries Limited, Montreal, Quebec, Canada, a corporation of Quebec No Drawing. Application May 19, 1948, Serial No. 28,053. In Canada August 30, 1947

8 Claims. (Cl. 260—45.5)

This invention relates to new polymeric materials and in particular to compositions comprising polymeric 4-vinylcyclohexene dioxide and polyvinyl acetals.

In copending application Serial No. 766,453 filed Aug. 5, 1947 in the name of O. C. W. Allenby now abandoned and U. S. Patent No. 2,460,195 issued January 25, 1949 to G. H. Segall there are described methods of polymerizing 4-vinylcyclohexene dioxide. In copending application Serial Nos. 28,744 filed June 29, 1948, and 86,864 filed April 11, 1949, in the names of W. J. Hornibrook and O. C. W. Allenby compositions comprising polymeric 4-vinylcyclohexene dioxide and vinyl polymers free of active hydrogen-containing groups are disclosed. I have now found that novel and useful compositions of matter comprising polymeric 4-vinylcyclohexene dioxide and polyvinyl acetals can readily be obtained.

It is, therefore, an object of this invention to provide a process for preparing compositions of matter comprising polymeric 4-vinylcyclohexene dioxide and polyvinyl acetals. An additional object of the invention is to provide new polymeric materials comprising polymeric 4-vinylcyclohexene dioxide and polyvinyl acetals. Further objects of this invention will appear from a perusal of the examples and claims hereinafter described.

The objects of this invention are attained by dissolving a polyvinyl acetal in 4-vinylcyclohexene dioxide and polymerizing the 4-vinylcyclohexene dioxide. The objects of this invention are attained in a more specific manner by dissolving between 1 and 20 parts of a polyvinyl acetal in between 99 and 80 parts 4-vinylcyclohexene dioxide and polymerizing the 4-vinylcyclohexene dioxide under controlled conditions, in the presence of a catalyst. A more detailed description of the invention will be found in the following examples. These examples are for illustrative purposes only and in no way are they to be considered as restricting the scope of the invention except as defined in the appended claims.

All proportions given are parts by weight.

Example I

Five parts polyvinyl formal was dissolved in 95 parts 4-vinylcyclohexene dioxide. To a 5 ml. portion of this solution maintained at a temperature of 0° C. was added 5 drops of a 10% solution of perchloric acid in glacial acetic acid. This solution was gradually raised to a temperature of 50° C. After 1½ hours it had gelled. Further heating at a temperature of 50° C. for 3½ hours and at approximately 100° C. for about 15 hours the product was a hard clear colourless solid.

Example II

Five parts polyvinyl acetal was dissolved in 95 parts 4-vinylcyclohexene dioxide. To a 5 ml. portion of this solution maintained at a temperature of 0° C. was added 5 drops of a 10% solution of perchloric acid. Upon slowly raising the temperature of this solution to 50° C. and maintaining it at 50° C. for ½ hour the solution gelled. After a further heating for about fifteen hours at 100° C. a hard shiny clear light yellow solid had formed.

Example III

A solution of 10 parts polyvinyl acetal in 90 parts 4-vinylcyclohexene dioxide was prepared and treated as described in Example II. The final product was a shiny clear light yellow solid.

Example IV

A solution of 5 parts polyvinyl butyral in 95 parts 4-vinylcyclohexene dioxide was prepared. To a 5 ml. portion of this solution maintained at a temperature of 0° C. was added 5 drops of a 10% solution of perchloric acid in glacial acetic acid. The resulting solution was then gradually warmed to a temperature of about 100° C. and maintained at this temperature for about 20 hours. The resulting product was a hard clear colourless solid.

Example V

A solution of 10 parts polyvinyl butyral in 90 parts 4-vinylcyclohexene dioxide was prepared and treated as described in Example IV. The resulting product was a hard clear colourless solid.

Example VI

A solution of 15 parts polyvinyl butyral in 85 parts 4-vinylcyclohexene dioxide was prepared. To a 10 ml. portion of this solution maintained at a temperature of 0° C. was added 10 drops of a 10% solution of perchloric acid in glacial acetic acid. This was then slowly warmed to a temperature of 50° C. The solution was so viscous that bubbles of air formed while adding the catalyst. These did not escape to the top before gelling took place. The final product was a moderately hard solid which was clear except for the entrapped bubbles.

All the products obtained by the process illustrated in the above examples are hard clear solids which can readily be machined and polished. They appear to be solutions of a polyvinyl acetal in polymeric 4-vinylcyclohexene dioxide. These polymeric compositions can be formed into desired shapes by pouring the solution of the polyvinyl acetal in 4-vinylcyclohexene dioxide into a mould and polymerizing the 4-vinylcyclohexene dioxide. The products of this invention are particularly useful in protective coatings. They may be coloured by the addition of a suitable dye to the material before polymerizing.

The concentrations of the polyvinyl acetal in 4-vinylcyclohexene dioxide which may be used depend upon the maximum solubility of the polyvinyl acetal and upon the degree of modification desired. Thus the upper limit of concentration of the polyvinyl acetal is set by its solubility in 4-vinylcyclohexene dioxide while the lower limit is determined by the smallest amount necessary to effectively modify the polymeric 4-vinylcyclohexene dioxide. The former is in excess of 15% while the latter is less than 1%.

Considerable difficulty is experienced in the higher concentrations in getting thorough mixing since, at the temperature at which the catalyst is added, the solutions of the polyvinyl acetal in 4-vinylcyclohexene dioxide are very viscous. It is not always possible to obtain uniform distribution of the catalyst without prolonged stirring. Obviously if the catalyst is not uniformly distributed throughout the mass the rate of polymerization differs in different parts of the reaction mass which leads to different degrees of polymerization in different parts of the product and hence lack of uniformity in properties. For instance, one part of the solid product would be quite hard while another soft. Furthermore, with these viscous solutions it is difficult to avoid entrapping small bubbles of air when stirring in the catalyst. Unless these are removed, which is frequently impossible before polymerization has proceeded very far, these bubbles of entrapped air remain in the product. Therefore, when endeavouring to prepare a product of uniform properties it is preferable to use a solution of a polyvinyl acetal in 4-vinylcyclohexene dioxide of such concentrations that these difficulties are avoided. In general concentrations of less than 15% appear to meet these requirements.

Alternatively the viscosity of the concentrated solution may be reduced by diluting the solution with some suitable solvent such as acetone before adding the catalyst. This solvent is usually evaporated off before polymerization has proceeded very far. In this way the above mentioned difficulties may be overcome.

Perchloric acid is not the only catalyst which may be used to polymerize 4-vinylcyclohexene dioxide as is disclosed in copending application Serial No. 766,453 filed August 5, 1947 in the name of O. C. W. Allenby and U. S. Pat. No. 2,460,195 issued January 25, 1949, to G. H. Segall. Thus, instead of perchloric acid the process of this invention may be carried out using boric acid, zinc chloride, stannic chloride, arsenious oxide, boron trifluoride, sulphuric acid, sodium methoxide, benzoyl peroxide, sodium perborate, trimethyl borate, dihydroxyfluoboric acid, oleum fluosulphonic acid, chlorosulphonic acid, periodic acid, chloric acid, iodic acid, ferric chloride, aluminium chloride, boron trifluoride, silicon tetrachloride, arsenic trichloride, antimony trichloride, phosphorus trichloride, antimony trioxide and phosphorus trioxide.

The temperature at which polymerization of 4-vinylcyclohexene dioxide may be carried out ranges from about 20° C. to about 120° C. with perchloric acid as catalyst. With less active catalysts higher temperatures might be desirable. If polymerization is attempted at a temperature lower than 20° C. the time required to produce a hard product is excessively long. On the other hand if a temperature of more than 120° C. is used the reaction proceeds too quickly and frequently results in a crazed or friable product. The preferred range of temperature is from about 50° C. to about 100° C.

It is essential to the operation of the process of this invention that the polyvinyl acetal be soluble in the monomeric 4-vinylcyclohexene dioxide. Therefore, any polyvinyl acetal in addition to those given in the example which is soluble in 4-vinylcyclohexene dioxide may be used to carry out the process of the invention.

If desired, plasticizers may be added. Any plasticizer which is used with polyvinyl acetal and which is compatible with monomeric and polymeric 4-vinylcyclohexene dioxide may be used.

It will be obvious to those skilled in the art that many widely different embodiments of this invention may be made without departing from the spirit and scope thereof and hence it is to be understood that I do not limit myself to the specific embodiments thereof except as defined in the appended claims.

Having thus described my invention what I claim is:

1. A process for preparing a polymeric composition which comprises dissolving a polyvinyl acetal in 4-vinylcyclohexene dioxide and polymerizing the 4-vinylcyclohexene dioxide in the presence of a catalyst.

2. A process for preparing a polymeric composition which comprises dissolving polyvinyl formal in 4-vinylcyclohexene dioxide and polymerizing the 4-vinylcyclohexene dioxide in the presence of a catalyst.

3. A process for preparing a polymeric composition which comprises dissolving polyvinyl acetal in 4-vinylcyclohexene dioxide and polymerizing the 4-vinylcyclohexene dioxide in the presence of a catalyst.

4. A process for preparing a polymeric composition which comprises dissolving polyvinyl butyral in 4-vinylcyclohexene dioxide and polymerizing the 4-vinylcyclohexene dioxide in the presence of a catalyst.

5. The polymeric composition of the process of claim 1.

6. The polymeric composition of the process of claim 2.

7. The polymeric composition of the process of claim 3.

8. The polymeric composition of the process of claim 4.

WALTER JOHN HORNIBROOK.

REFERENCES CITED

The following references are of record in the file of this patent:

UNITED STATES PATENTS

| Number | Name | Date |
|---|---|---|
| 2,450,234 | Evans et al. | Sept. 28, 1948 |
| 2,460,195 | Segall | Jan. 25, 1949 |